United States Patent
Zhang

(10) Patent No.: US 9,389,920 B2
(45) Date of Patent: Jul. 12, 2016

(54) INTELLIGENT DATA CENTER CLUSTER SELECTION

(75) Inventor: Hong Zhang, Palo Alto, CA (US)

(73) Assignee: Futurewei Technologies, Inc., Plano, TX (US)

(*) Notice: Subject to any disclaimer, the term of this patent is extended or adjusted under 35 U.S.C. 154(b) by 565 days.

(21) Appl. No.: 13/462,290

(22) Filed: May 2, 2012

(65) Prior Publication Data

US 2013/0297770 A1 Nov. 7, 2013

(51) Int. Cl.
*H04L 29/08* (2006.01)
*G06F 9/50* (2006.01)

(52) U.S. Cl.
CPC ............ *G06F 9/505* (2013.01); *H04L 67/1008* (2013.01); *H04L 67/1023* (2013.01); *H04L 67/1025* (2013.01)

(58) Field of Classification Search
CPC ............ H04L 67/1002; H04L 67/1008; H04L 67/1014; H04L 67/1023; H04L 67/14; H04L 67/101; H04L 67/1012; H04L 67/1029; H04L 67/1031; H04L 67/322; H04L 43/04
USPC ......... 709/203, 217, 218, 219, 223, 224, 226, 709/227, 228, 240
See application file for complete search history.

(56) References Cited

U.S. PATENT DOCUMENTS

| | | | | |
|---|---|---|---|---|
| 7,062,556 B1* | 6/2006 | Chen | ................... | G06F 9/505 709/201 |
| 2002/0194345 A1* | 12/2002 | Lu | ................... | H04L 29/06 709/227 |
| 2006/0224725 A1* | 10/2006 | Bali | ................... | H04L 67/1002 709/224 |
| 2009/0125621 A1* | 5/2009 | DeLima | ................... | H04L 29/06 709/223 |
| 2010/0094970 A1* | 4/2010 | Zuckerman | ................... | H04L 67/1008 709/219 |
| 2010/0228861 A1* | 9/2010 | Arsovski | ................... | G06F 9/5027 709/226 |
| 2011/0191449 A1* | 8/2011 | Swildens | ................... | G06Q 40/00 709/219 |
| 2011/0246653 A1* | 10/2011 | Balasubramanian | ................... | G06F 17/5045 709/226 |
| 2012/0290725 A1* | 11/2012 | Podila | ................... | G06F 9/5011 709/226 |

* cited by examiner

*Primary Examiner* — Barbara Burgess
(74) *Attorney, Agent, or Firm* — Slater Matsil, LLP

(57) ABSTRACT

A method and technique for autonomous selection of a Data Center Cluster (DCC) for fulfilling a cloud computing service request, including a technique for grouping data centers (DCs) in a cloud network according to a ranking of eligible DCCs based on selection criteria. In various embodiments, the selection criteria may include a cluster performance metric, a cluster resource equivalence metric, a balance of resource performance metric, a DCC load index, or combination thereof. Other aspects include techniques for computing/determining each of the selection criteria.

16 Claims, 2 Drawing Sheets

INTELLIGENT DATA CENTER CLUSTER SELECTION

TECHNICAL FIELD

The present invention generally relates to cloud computing networks, and, more specifically, to an intelligent data center cluster selection mechanism for optimal delivery of cloud services.

BACKGROUND

Cloud computing is the delivery of computing resources as a service (rather than a product), thereby allowing users to access services on-demand and without having to purchase a terminal software license or high-performance hardware (e.g., processors, memory, etc.) used to run that software. Users may access cloud computing resources by submitting cloud computing service requests (e.g., to run a word processing application) to a cloud network, which may respond by providing the requisite resources (e.g., word processing application data, processing, memory, etc.) needed to fulfill the request via one or more data centers (DCs).

From an efficiency standpoint, it generally may be desirable to fulfill each cloud computing service request using a single DC. However, some cloud computing service requests may require resources that no single DC in the cloud network is capable of providing individually, and consequently satisfaction of such cloud service requests may require that multiple DCs work in collaboration. For instance, a first DC may provide a processing resource, a second DC may provide a memory resource, and so-on-and-so forth. The combination of DCs for fulfilling a cloud service request is generally selected based on a manual configuration, which may include manually selecting DCs based solely on their proximity to the requesting user. However, this solution may be slow, labor intensive, and (at least in some implementations) unreliable at identifying an optimal group of DCs to fulfill the request. Consequently, an improved technique for selecting candidate DCCs to fulfill cloud computing service requests is desired.

SUMMARY OF THE INVENTION

Technical advantages are generally achieved by preferred embodiments of the present invention, which describe an intelligent data center cluster selection mechanism in cloud computing.

In accordance with an embodiment, a method is provided for selecting an optimal data center (DC) cluster (DCC) to fulfill a cloud service request in a cloud network based on selection criteria that includes one or more of a network communication cost, a cluster performance metric, a cluster resource equivalence metric, a balance of resource performance metric, and a DCC load index. In this example, eligible DCCs may be ranked based on the selection criteria, and the highest ranked DCC may be selected to fulfill the cloud service request.

In accordance with another embodiment, a method is provided for selecting an optimal DCC to fulfill a cloud service request in a cloud network based on a lowest computed network communication cost amongst each of the eligible DCCs.

In accordance with yet another embodiment, a computer program product is provided for selecting a DCC to fulfill a cloud service request. In this example, the computer program product includes programming instructions for ranking the plurality of candidate DCCs based on selection criteria that includes one or more of a network communication cost, a cluster performance metric, a cluster resource equivalence metric, a balance of resource performance metric, and a DCC load index. The highest ranked DCC is selected to fulfill the cloud computing service request.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
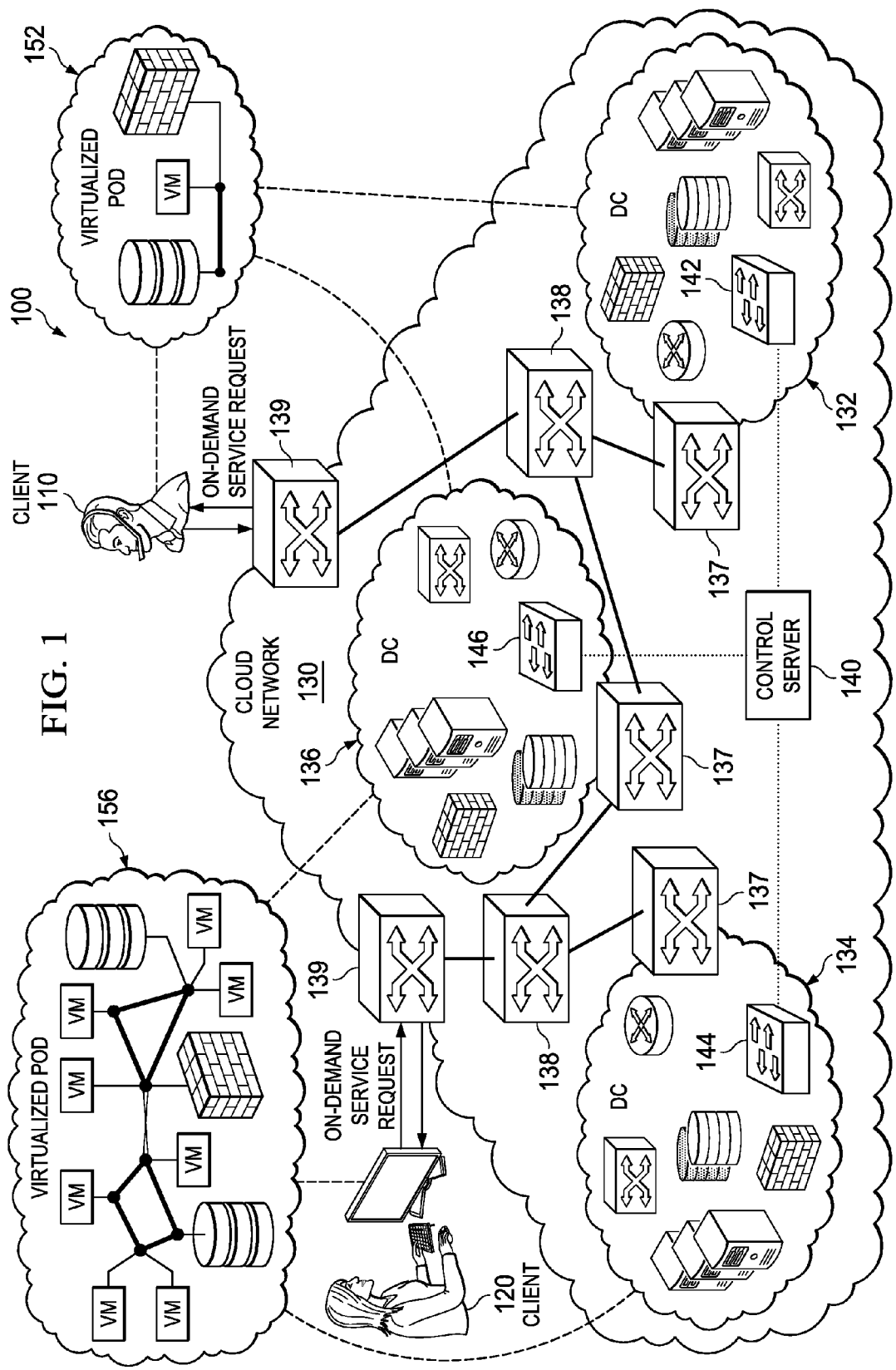
FIG. 1 illustrates a diagram of a cloud network architecture.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One alternative to the prior art technique of manually selecting groups of DCs (e.g., based solely on their proximity to the requesting user) is to autonomously select groups of DCs according to a ranking based on one or more selection criteria. The selection criteria may include one or more of a cluster performance metric, a cluster resource equivalence metric, a balance of resource performance metric, a DCC load index, or combinations thereof. The network performance cost corresponds to a load placed on the network if the candidate DCC is selected. The cluster performance metric corresponds to an average performance index of member DCs of the instant DCC, and may relate to relative performance characteristic (e.g., speed, etc.) of the instate DCC. The cluster resource equivalence metric corresponds to an average individual resource equivalence index of member DCs of an instant DCC, and may relate to the ability of the cloud network to fulfill future cloud computing service requests using a single DC. The balance of resource performance metric corresponds to a resource performance variation among member DC's providing different resource types, and may relate to latencies involved with providing a resource and/or speak to the timeliness in which the service is provided by the instant DCC. The DCC load index criteria for a given DCC may be an average load value of a DCC's collective resources represented as a percentage, and may relate to an ability of the instant DCC to fulfill future cloud computing service requests.

Benefits to the autonomous techniques described herein may include reduced service request response, increased service performance, reduced network congestion, and/or more efficient utilization of physical resources. For instance, the autonomous selection technique described herein may be executed more quickly than comparable manual configuration techniques. Further, the autonomous selection technique described herein may consider performance related selection criteria (e.g., cluster performance metric, balance of resources metric, etc.), and therefore may select a DCC that provides a faster and/or more balanced service in comparison to the DCC which would have been selected based solely off the member DC's proximity to the user. By way of example, the autonomous techniques described herein may (in some embodiments) select a DC that provides faster processing, even if said DC is located further from the user than other DCs capable of providing the processing resource (albeit, at a slower processing speed). Additionally, the autonomous techniques discussed herein may reduce network congestion and/or provide more efficient utilization of physical resources than manual configuration techniques by virtue of considering appropriate selection criteria, such as those criteria related to the cloud network's ability to satisfy future cloud service requests using fewer DCs (e.g., a single DC, two DCs, etc.). For instance, selecting DCs with balanced performance capacities may increase the likelihood that the cloud network will fulfill future cloud service requests using a single DC (which is generally more efficient than using multiple DCs).

An optimal DCC may be determined relative to the selection criteria used during the ranking process, as well as the various weights that each selection criteria is assigned (assuming multiple selection criteria are used). For instance, in one embodiment, the selection process may prioritize the conservation of network resources by assigning a higher weight to, say, the network communication cost criteria than to other selection criteria. In other embodiments, the selection process may prioritize the quality of service by assigning a higher weight to, say, the cluster performance criteria than to other selection criteria. These and other aspects are explained throughout this disclosure.

FIG. 1 illustrates an exemplary cloud network architecture 100 for which a group of DCs may be autonomously selected (e.g., according to the techniques of this disclosure) to satisfy a cloud computing service request. The cloud network architecture 100 may comprise a plurality of users 110-120, a cloud network 130, and a plurality of virtualized point of delivery (PODs) 152, 156. The users 110-120 may be any device or entity requesting the services in the cloud network architecture 100. The cloud network 130 may comprise any collection of devices for providing cloud services to the users 110-120, including a plurality of interconnected DCs 132-136, a plurality of DC edge routers 137, one or more internal network routers 138, a plurality of network edge routers 139, and a control server 140. The DCs 132-136 may be any device or collection of devices that provide services (e.g., programs, application data, etc.) and/or virtualized physical resources (e.g., processing capacity, memory, disk space, bandwidth, etc.) used to provide said services. The DCs 132-136 may be interconnected through a variety of means, such as through one or more wide area networks (WANs) or any other configuration that allows the DCs 132-136 to communicate in the cloud network 130. In some embodiments, the DCs may be interconnected via the plurality of DC edge routers 137, one or more internal network routers 138, and/or one or more network edge routers 139. The DC edge routers 137 may facilitate the communication of data into (or out-of) the DCs 132-136. The internal network router(s) 138 may facilitate the transportation of data throughout the cloud network 130. The network edge routers 139 may facilitate the communication of data into (or out-of) the cloud network 130. The resources provided by the DCs 132-136 may be virtualized in one or more virtualized PODs 152, 156. The virtualized PODs 152 and 156 may represent procurement units of the DCs 132-136, as viewed by the clients 110 and 120 (respectively). The virtualized PODs 152 and 156 may comprise a plurality of virtual physical resources that map to real physical resources provided by the DCs 132-136. For instance, the virtualized POD 152 may comprise virtual physical resources that map to the real physical resources of the DCs 132 and 136, while the virtualized POD 156 may comprise virtual physical resources that map to the DC 134 and 136. In an embodiment, the virtualized POD 152 may comprise virtual physical resources that map to those real physical resources that are consumed (or otherwise used) by the client 110, while the virtualized POD 156 may comprise virtual physical resources that map to those real physical resources that are consumed (or otherwise used) by the client 120. The users 110-120 may access these virtualized resources, as demonstrated by the dashed lines, via the cloud network. Note, the dashed lines are a virtual plane that constitute a virtual representation of the clients 110, 120 accessing resources of the DCs 132-136 (e.g., which are represented in the virtualized PODs). These resources are physically provided through the data plane (bolded lines) extending between the various routers 137-139 of the cloud network 130 (rather than directly through the dashed lines).

The control server 140 may be any component or collection of components capable of selecting an optimal DCC to service a cloud computing resource request based on one or more selection criteria. In an embodiment, the control server 140 may be a centralized software module installed on a piece of hardware/equipment in the cloud network 130. For instance, the control server may be located within one of the DC edge routers 137, or within one of the network edge routers 139$n$ other embodiments, the control server 140 may be a standalone device located in the cloud network 130. In yet other embodiments, the control server 140 may be located outside of the cloud network 130. The control server 140 may communicate with the DCs 132-136 using a control plane (dotted lines) that extends from the control server 140 to the plurality of modules 142-146 located on or near the DCs 132-136. In some embodiments, the modules 142-146 may be standalone modules located in or near the DCs 132-136. In other embodiments, the modules may be positioned on the DC edge routers 137. The modules 142-146 may be software, a combination of hardware and software, or purely hardware. A module or remote interface (not shown) may also be positioned on the network edge routers 139, and may be used to forward cloud computing service requests to the control server 140 upon the reception of said request at the network edge router 139. The modules 142-146 may forward information (e.g., relating to load, performance, communication cost, etc.) of their corresponding DCs to the control server 140. This may be in response to a query by the control server 140 and/or on a periodic basis.

Figure 2:
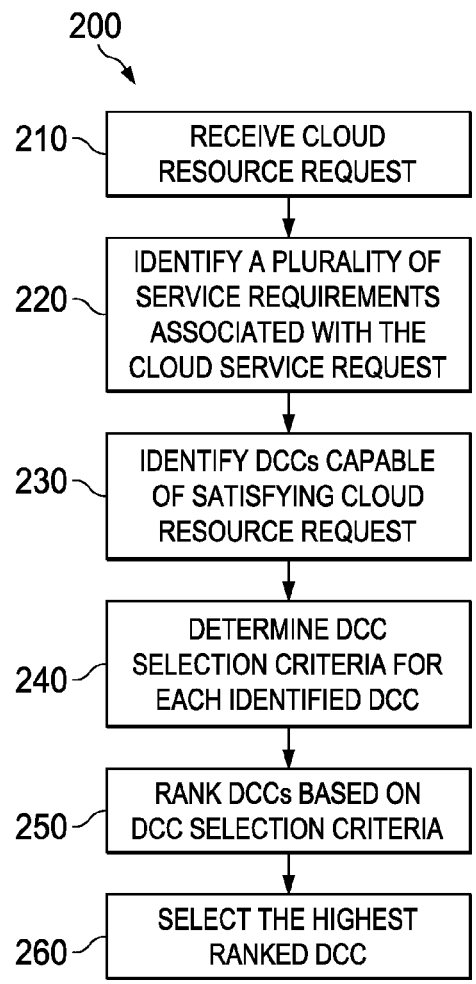
FIG. 2 illustrates a flow chart of an embodiment of a method for selecting a group of DCs to fulfill a cloud service request.

FIG. 2 illustrates a method 200 for selecting a DCC to fulfill a cloud computing service request. For instance, the method 200 may be implemented by the control server 140 to select a combination of two or more of the DCs 132-136 for satisfying a cloud computing service request of one of the clients 110 or 120. The method 200 may begin at block 210, where a control server (e.g., the control server 140) may receive a cloud computing service request from a user (e.g., the user 110). The cloud computing service request may be received directly from a requesting user, or alternatively forwarded from an intermediate edge router (e.g., router 139) in the cloud network. Next, the method 200 may proceed to block 220, where the control server may identify a plurality of service requirements associated with the cloud computing service request. The service requirements include the service tier information. The service tier information may be represented in a template format, which may include a type of application, a computation level (e.g., from 1 to 10, or any other range of computation levels), a storage level (e.g., from 1 to 10), a network service level (gold, silver, brown, etc.) as well as other levels and/or indicators. Any type of range or level may be used in setting the computation and/or other levels noted herein. The above ranges (e.g., from 1 to 10) for various levels or indicators are used herein for illustrative purposes only, and are not meant to limit or otherwise narrow the scope of the present invention unless otherwise claimed.

Additionally or alternatively, the service tier information may be represented in a non-template format, which may include (but is not limited to) a type of application, a number of VMs, a number of storage blocks, a network latency, a jitter, a security, etc. For instance, if a cloud computing service request requests to run a word processing service (e.g., MS word), then the control server may identify an application data resource associated with the word processing service (e.g., MS word software) as well as a required or desirable amount of processing resources and a required or desirable amount of memory resources.

The method 200 may then proceed to block 230, where the control server may identify a plurality of DCCs capable of satisfying the cloud resource request as eligible or candidate DCCs. For instance, (referring to FIG. 1), a first eligible DCC may comprise the DC 132 and the DC 134, while a second eligible DCC may comprise the DC 134 and the DC 136. Hence, DCCs can have overlapping member DCs. A DCC may include any number of member DCs, although two member DCs may typically be preferable over three or more member DCs for network efficiency reasons. Optionally, the control server may first determine that no available DCs in the cloud network are capable of individually fulfilling the cloud computing service request before identifying candidate DCCs. Candidate DCCs may be identified by collecting or referencing resource availability information of one or more DCs in the network. A DC's resource availability information may correspond to an amount and/or type of resources that the DC is capable of providing, e.g., resource that are not currently deployed cloud network or otherwise reserved, as well as other information pertaining to those resources (e.g., loads, performance metrics, etc.). In some embodiments, the available resources may include discretionary resources that are currently being provided to a lower priority user, but would be available for access by the requesting user (e.g., resources that may be optionally diverted to a higher priority user upon request).

In some embodiments, the resource availability information may be gathered by the control server upon receiving the cloud computing service request. In other embodiments, the resource availability information may be gathered periodically (e.g., prior to receiving the cloud computing service request), and stored in a table for reference by the control server upon receiving the cloud computing resource request. In any event, the control server may identify some (or all) potential combinations of DCs that are collectively capable of providing the identified resources, with each combination of DCs constituting a candidate DCC.

Next, the method 200 may proceed to block 240, where the control server may determine one or more selection criteria for each identified DCC. The selection criteria may include a network communication cost criteria, a cluster performance criteria, a cluster resource equivalence criteria, a balance of resource performance criteria, a DCC load index criteria, or combinations thereof. The criteria may be determined under the assumption that the instant DCC was selected to satisfy the cloud computing resource request, and may be based on the available resource information communicated to the control server by the DCs.

The network communication cost criteria for an instant DCC may correspond to a load that would be placed on the cloud network if that DCC was selected to satisfy the cloud computing service request. The network communication cost criteria may include two components, namely: (1) a DC-to-user cost component; and (2) a DC-to-DC cost component. The DC-to-user cost component may correspond to the cumulative cost of transporting resources from the member DCs to the user, while the DC-to-DC cost may refer to the cumulative cost of transporting resources from one DC to another DC.

The DC-to-User cost component may be computed according to the formula:

$$Cost_{DC\text{-}to\text{-}User} = \sum_{k=1}^{m} C^k * V^k,$$

where m is a number of resources that must be provided to satisfy the cloud computing service request, $C^k$ is a function of a communication cost between a corresponding one of the DCs providing an instant resource (resource-k) and the user, $V^k$ is a volume of data that must be communicated between the corresponding DC providing the resource-k and the user.

The cost $C^k$ may correspond to the cost of communicating a unit of data (e.g., a byte) between the instant member DC to the user (or vice versa), and may be a function of network proximity as well as network performance. For instance, $C^k$ may be affected by the proximity of the instant member DC (i.e., the member DC providing the resource-k) in relation to the user, as well as by the performance of intermediate network infrastructure/components (e.g., lines, switches, wireless interfaces, etc.) over which the data is transported. $C^k$s for two or more resources provided by a common member DC may be the same so long as the resources are communicated over the same path. For instance, if a given member DC providing a first resource (resource-1) and a second resource (resource-2) transports the data over the same path, then the $C^k$ for resource-1 may be equivalent to the $C^k$ for resource-2. On the other hand, $C^k$s for resources located at remotely located DCs (or resources for which the data is transported over different paths) may differ substantially.

The volume $V^k$ may correspond to an amount of data or traffic that is transported between the instant member DC and the user as a result of providing the resource to the user. The volume $V^k$ may be a function of a projected average data traffic communicated between the DC and the user for a period in which data is transported, and may be represented in packets or bytes per unit of time, e.g., bytes per second (b/s). Some resources (e.g., storage resources) may require direct communication from the user to the DC as well as from the DC to the user (e.g., bi-directional communication). Hence, $V^k$ may include traffic communicated from the user to the DC as well as traffic communicated from the DC to the user. If the bi-directional traffic flows traverse the same route between the user and the DC, then the cost $C^k$ may be about the same for each traffic flow. Alternatively, if the bi-directional traffic flows traverse different routes between the user and the DC, then the cost $C^k$ may differ for the respective traffic flows. Some resources (e.g., processing resources) may not require any communication between the DC and the user, and consequently the volume $V^k$ for those resources may be zero.

The DC-to-DC cost may arise from dependent resources being provided from remotely located member DCs. As referred to herein, dependent resources are resources that cannot be independently provided to a user, while independent resources are resources that can be separately provided to the user. For instance, processing resources provided by a first member DC may generate (or consume) data that is stored in memory resources provided by a second member DC, thereby requiring the data to be transported between the first member DC and the second member DC. Accordingly, processing resources and memory resources may be considered dependent resources (at least in this example), and a portion of the DC-to-DC cost component may be attributable to transporting the data between the first member DC and the second member DC. On the other hand, independent resources may have a DC-to-DC cost of approximately zero.

The DC-to-DC cost component may be given by the formula:

$$Cost_{DC\text{-}to\text{-}DC} = \sum_{i=1,j=i+1}^{m-1} C^{r^i,r^j} * V^{r^i,r^j},$$

where m is equal to a number of resources that must be provided to satisfy the cloud computing service request, $C^{r^i,r^j}$ is a function of a communication cost between the first member DC (i.e., the member DC providing the first dependent resource (resource-i)) and the second member DC (i.e., the member DC providing the second instant resource (resource-j)), and $V^{r^i,r^j}$ represents a volume of data that must be communicated between the first member DC and the second member DC when providing the resource-i and/or the resource-j. The volume $V^{r^i,r^j}$ may be a function of the potential average data traffic communicated between a pair of DCs, while the cost $C^{r^i,r^j}$ may be affected by a function of the proximity of the member DCs in relation to one another as well as network performance. If two DCs are co-located, then $C^{r^i,r^j}$ may be zero. If two resources are independent, then $V^{r^i,r^j}$ may be zero.

Accordingly, the network communication cost criteria may be the summation of the DC-to-User cost component and the DC-to-DC cost component, and may be given by the following formula:

$$Cost = \sum_{k=1}^{m} C^k * V^k + \sum_{i=1,j=i+1}^{m-1} C^{r^i,r^j} * V^{r^i,r^j}.$$

The cluster performance criteria for an instant DCC may correspond to an average performance index for all member DCs. The average performance index may be determined based on several factors, including a networking status and performance metric, a computing status and performance metric, and a storage status and performance metric. The computing status and performance metric may refer to a throughput (e.g., a rate of processing work in bytes per second) of an instant DC. The computing status and performance metric may include other metrics, such as performance-per-watt or any other metric that may be related to the throughput of an instant DC. The network status and performance metric may refer to a line rate and/or available bandwidth corresponding to an instant DC, which may be defined by the performance of a single intermediate network device (switch/router). In an embodiment, the network status and performance metric may differ from cost components of the network communication cost criteria in that status and performance metric may focus on the performance of a signal device (e.g., a most limiting intermediate device), while the cost components of the network communication cost may focus on the overall network performance between devices, e.g., which may include (amongst other things) latency, jitter, etc. from a POD resources to a DC's edge router/switch. The storage status and performance metric may refer to a performance of a DC's memory storage, and may be given in megabytes-per-second (MB/s)) and/or in input/output (I/O) operations-per-second (IO/s).

The cluster resource equivalence criteria for an instant DCC corresponds to an average individual resource equivalence index for one or more member DCs. In some embodiments, the cluster resource equivalence criteria corresponds to all member DCs of the instant DCC. In other embodiments, the cluster resource equivalence criteria corresponds to some, but not all, of the member DCs of the instant DCC. A member DC's resource equivalence index may be measured by load variation among the different types of resources of the DC. The load variation may be given as a percentage of a member DC's total resource capacity that is being used (or would be used if the DCC was selected). A small load variation may indicate that the relative capacities of the available resources are in-line with one another such that one resource type is not substantially depleted in relation to other resource types. For example, if a member DC's current computing load is 90% (e.g., meaning 90% of the available memory resources are being used), while the current member DC's memory load is only 10% (e.g., meaning that 10% of the available memory resources are being used), then the member DC may have a high load variation (at least with respect to these two resources) because the resource load differs greatly between resource types. As mentioned above, it is generally desirable from a network efficiency standpoint to fulfill each cloud computing service request using a single DC. Likewise, it may be advantageous to balance (to the extent possible) the loads placed on each resource type of a given DC such that the DC does not, for example, have an abundance of memory resources but little or no processing resources available for servicing future requests. In other words. Hence, by considering the resource equivalence metric, the control server may avoid depleting one type of resource in a DC while leaving other types of resources in the DCC underutilized. Such measures may increase the likelihood that future cloud computing resource requests are satisfied by a single DC (e.g., rather than multiple DCs), thereby resulting in potential network efficiencies. Hence, such measures may decrease the amount of network load attributable to the DC-to-DC cost component moving forward.

The balance of resource performance criteria for an instant DCC may correspond to a resource performance variation among the member DC's providing the different resource types, particularly when said resource types are dependent upon one another, or when two resources are provided in parallel. Resource performance may correspond to latencies involved with providing a resource, and may be correspond to (or be affected by) a variation in the queue lengths of the providing DCs. For instance, a first DC that provides a first resource may have a larger queue than a second DC providing a second resource, and therefore it may take longer to provide the first resource than the second resource. If the first resource and second resource are dependent on one another, then the relatively high latency involved with providing the first resource may overshadow the relatively low latency involved with providing the second resource. Further, if the first resource and the second resource are provided in parallel (e.g., at the same time, rather than sequentially), then the service latency may be mostly dependent on latencies involved in providing the first resource (e.g., the second resource may wait on the first resource). Hence, the timeliness in which the service is provided may be influenced by the first DC's queue to a greater extent than the second DC's queue. Consequently, it may be more efficient from a network performance perspective to pair member DCs having similar levels of performance, so that resources of a strong performer (e.g., the second DC) are not wasted on a weak performer (e.g., the first DC). As such, selecting DCCs based (at least in part) on a balance of resource performance criteria may increase the overall quality of service provided by the cloud network.

The DCC load index criteria for a given DCC may be an average load value of a DCC's resources represented as a percentage. In an embodiment, this consideration may pool the resource loads of all member DCs for the various resource types, and compare them in relation to one another. For instance, if the average load value of one DCC's resources is lower than that of another DCC, then the DCC with the lower resource load may be a better candidate to provide the service.

After determining and/or computing the DCC selection criteria in step 240, the method 200 may proceed to step 250, where the DCCs may be ranked based on one or more of the DCC selection criteria. Ranks may be assigned based on the normalized value of selection criteria. After ranking the DCCs, the method may proceed to step 260, where the control server may select the highest ranked DCC to fulfill the cloud computing resource request or it can provide the ranked DCC list as well as its ranking criteria details to the user.

Figure 3:
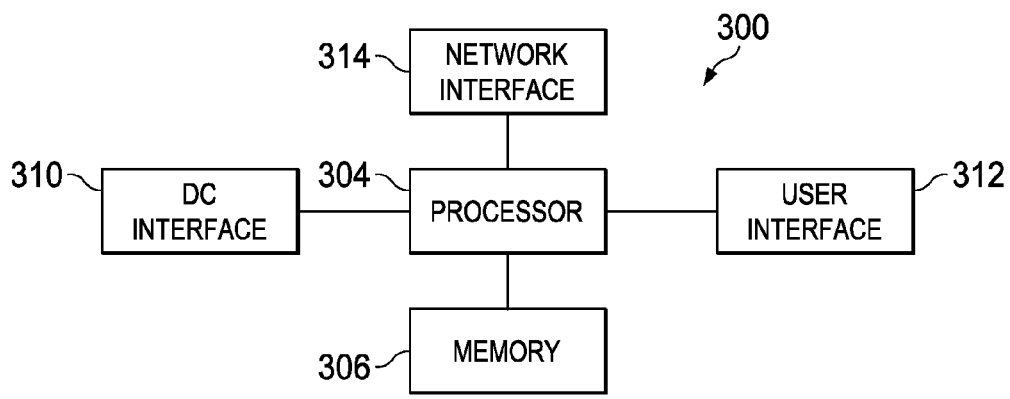
FIG. 3 illustrates a block diagram of an embodiment of a control server.

FIG. 3 illustrates a block diagram of an embodiment control server 300. The control server 300 may include a processor 304, a memory 306, a DC interface 310, a user interface 312, and a network interface 314, which may (or may not) be arranged as shown in FIG. 3. The processor 304 may be any component capable of performing computations and/or other processing related tasks, and the memory 306 may be any component capable of storing programming and/or instructions for the processor 304. The DC interface 310 may be any component or collection of components that allows the control server 300 to communicate with DCs in a cloud network, and may be used to receive information (e.g., resource information) from, as well as transmit information (e.g., queries, instructions, etc.) to, DCs in the cloud network. The user interface 312 may be any component or collection of components that allows the control server 300 to communicate with a user, and may be used to receive information (e.g., cloud computation resource requests, etc.) from, as well as transmit information (e.g., responses, etc.) to, the users. The network interface 314 may be any component or collection of components that allows the control server 300 to engage in network communications, and may be a supplementary or auxiliary interface used for various administrative and/or other functions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim:

1. In a control server of a network configured to identify candidate data center clusters (DCCs) for satisfying a service request, a method for grouping (DCs) in a cloud network, the method comprising:

receiving, by the control server, a cloud computing service request from a user;

identifying a set of candidate DC clusters (DCCs) for satisfying the cloud computing service request, wherein satisfying the cloud computing service request requires providing a plurality of resources to the user;

determining selection criteria for the set of candidate DCCs, wherein the selection criteria includes one or more of a network communication cost, a cluster performance metric, a cluster resource equivalence metric, a balance of resource performance metric, and a DCC load index; and ranking the set of candidate DCCs based on the selection criteria, wherein a highest ranked one out of the set of candidate DCCs is selected to satisfy the cloud computing service request, wherein the selection criteria includes the cluster resource equivalence metric, wherein determining the selection criteria comprises: determining a first cluster resource equivalence metric for a first candidate DCC in the set of candidate DCCs, the cluster resource equivalence metric comprising a load variation for a member DC of the first candidate DCC, the load variation corresponding to a variation between two or more resource loads of the member DC as would result from selecting the first candidate DCC to satisfy the cloud computing service request, wherein the load variation is indicative of a degree to which a first available resource of the member data center would be depleted in relation to a second available resource of the member data center as a result of selecting the first candidate DCC to fulfill the cloud computing service request, wherein the selection criteria further includes the network communication cost, wherein determining the selection criteria comprises determining a first network communication cost for a first one of the set of candidate DCCs, the first network communication cost comprising a DC-to-user cost component associated with the first candidate DCC and a DC-to-DC cost component associated with the first candidate DCC, and wherein determining the first network communication cost comprises computing the DC-to-user cost component according to the formula:

$$Cost_{DC\text{-}to\text{-}User} = \sum_{k=1}^{m} C^k * V^k,$$

where m is equal to a number of resources in the plurality of resources, $C^k$ is a cost for transporting a unit of data between the user and a member DC providing an instant resource (resource-k), and $V^k$ is a volume of data that must be communicated between the user and the member DC providing the resource-k while the resource-k is being provided.

2. The method of claim 1, wherein determining the selection criteria for the set of candidate DCCs further comprises determining a first balance of resource performance metric for a first one of the set of candidate DCCs, the first balance of resource performance metric being based on a performance variation between two or more of the resources provided by member DCs of the first candidate DCC and corresponding to a service latency that would result from that performance variation.

3. The method of claim 1, wherein the selection criteria further includes the DCC load index criteria, and wherein determining the selection criteria further comprises:

determining a first DCC load index criteria for a first one of the set of candidate DCCs, the DCC load index criteria comprising an average load value of different types of the resources of the first candidate DCC as would result from selecting the first candidate DCC to satisfy the cloud computing service request.

4. The method of claim 1 further comprising:
determining that none of the DC in the cloud network are capable of individually providing the plurality of resources to the user prior to identifying the set of DCCs.

5. The method of claim 1 further comprising:
selecting the highest ranked one out of the set of candidate DCCs to satisfy the cloud computing service request.

6. The method of claim 1 further comprising:
providing a selection information to the user, the selection information comprising a list of the ranked candidate DCCs and a list of the selection criteria,
wherein receiving the selection information causes the user to select the highest ranked one out of the set of candidate DCCs to satisfy the cloud computing service request.

7. The method of claim 1, wherein each candidate DCC in the set of candidate DCCs comprises two or more of the DCs that are collectively capable of providing the plurality of resources necessary for satisfying the cloud computing service request.

8. A method for grouping (DCs) in a cloud network, the method comprising:
receiving, by the control server, a cloud computing service request from a user;
identifying a set of candidate DC clusters (DCCs) for satisfying the cloud computing service request, wherein satisfying the cloud computing service request requires providing a plurality of resources to the user;
determining selection criteria for the set of candidate DCCs, wherein the selection criteria includes one or more of a network communication cost, a cluster performance metric, a cluster resource equivalence metric, a balance of resource performance metric, and a DCC load index; and
ranking the set of candidate DCCs based on the selection criteria, wherein a highest ranked one out of the set of candidate DCCs is selected to satisfy the cloud computing service request,
wherein the selection criteria includes the cluster resource equivalence metric,
wherein determining the selection criteria comprises determining a first cluster resource equivalence metric for a first candidate DCC in the set of candidate DCCs, the cluster resource equivalence metric comprising a load variation for a member DC of the first candidate DCC, the load variation corresponding to a variation between two or more resource loads of the member DC as would result from selecting the first candidate DCC to satisfy the cloud computing service request,
wherein the load variation is indicative of a degree to which a first available resource of the member data center would be depleted in relation to a second available resource of the member data center as a result of selecting the first candidate DCC to fulfill the cloud computing service request,
wherein the selection criteria further includes the network communication cost,
wherein determining the selection criteria comprises determining a first network communication cost for a first one of the set of candidate DCCs, the first network communication cost comprising a DC-to-user cost component associated with the first candidate DCC and a DC-to-DC cost component associated with the first candidate DCC, and
wherein determining the first network communication cost comprises computing the DC-to-DC cost component according to the formula:

$$\text{Cost}_{DC\text{-}to\text{-}DC} = \sum_{i=1, j=i+1}^{m-1} C^{r^i r^j} * V^{r^i r^j},$$

where m is equal to a number of resources in the plurality of resources, $C^{r^i r^j}$ is a cost for transporting a unit of data between a first member DC providing a first instant resource (resource-i) and a second member DC providing a second instant resource (resource-j), and $V^{r^i r^j}$ is a volume of data that must be communicated between the first member DC providing the resource-i and the second member DC providing the resource-j when providing one or both of the resource-i and the resource-j.

9. In a control server of a network configured to identify candidate data center clusters for satisfying a service request, a method for grouping data centers in a cloud network, the method comprising:
receiving, by the control server, a cloud computing service request from a user;
identifying a plurality of resources for satisfying the cloud computing service request;
identifying clusters of data centers that are collectively capable of satisfying the cloud computing service request, thereby obtaining a plurality of candidate data center clusters, each of which being capable of satisfying the cloud computing service request, wherein each data center cluster includes two or more data centers configured to perform processing tasks that are interconnected via wide area network (WAN) interfaces extending between edge routers of the two or more data centers;
computing a plurality of network communication costs each of which corresponding to a different one of the plurality of candidate data center clusters, wherein each network communication cost includes data center to data center (DC-to-DC) cost components associated with communicating information over the WAN interfaces that interconnect the two or more data centers of the corresponding data center cluster, and wherein computing the plurality of network communication costs includes computing a DC-to-DC cost component for each of the network communication costs according to the formula:

$$\text{Cost}_{DC-to-DC} = \sum_{i=1, j=i+1}^{m-1} C^{r^i r^j} * V^{r^i r^j},$$

where m is equal to a number of resources in the plurality of resources, $C^{r^i r^j}$ is a cost for transporting a unit of data between a first member data center providing a first instant resource (resource-i) and a second member data center providing a second instant resource (resource-j), and $V^{r^i r^j}$ is a volume of data that must be communicated between the first member data center providing the resource-i and the second member data center providing the resource-j when providing one or both of the resource-i and the resource-j; and selecting one of the plurality of candidate data center clusters that has the lowest network communication cost, wherein the selected candidate data center cluster is used to satisfy the cloud computing service request.

10. The method of claim 9, wherein the plurality of network communication costs comprise a first network communication cost corresponding to a first one of the plurality of candidate data center clusters, and wherein computing the first network communication cost further comprises:
  computing a data center to user (DC-to-user) cost component associated with the first candidate data center cluster;
  computing a DC-to-DC cost component associated with the first candidate data center cluster; and
  adding the DC-to-user cost component and the DC-to-DC cost component to obtain the first network communication cost.

11. The method of claim 10, wherein the first candidate data center cluster comprises a member data center for providing a first one of the plurality of resources, and
  wherein computing the DC-to-user cost component further comprises determining a network cost associated with transporting traffic between the member data center and the user as would result if the first candidate data center cluster was selected to fulfill the cloud computing service request, the traffic being transported as a result of providing the first resource.

12. The method of claim 10, wherein the first candidate data center cluster comprises a first member data center for providing a first one of the plurality of resources and a second member data center for providing a second one of the plurality of resources, and
  wherein computing the DC-to-DC cost component further comprises determining a network cost associated with transporting traffic between the first member data center and the second member data center as would result if the first candidate data center cluster was selected to fulfill the cloud computing service request, the traffic being transported as a result of providing one or both of the first resource and the second resource.

13. The method of claim 9 further comprising determining that none of the data centers in the cloud network are capable of individually providing each of the plurality of resources before identifying the plurality of candidate data center clusters.

14. The method of claim 9, wherein computing the plurality of network communication costs includes:
  computing a DC-to-user cost component for each of the network communication costs according to the formula:

$$\text{Cost}_{DC-to-User} = \sum_{k=1}^{m} C^k * V^k,$$

where m is equal to a number of resources in the plurality of resources, $C^k$ is a cost for transporting a unit of data between the user and a member data center providing an instant resource (resource-k), and $V^k$ is a volume of data that must be communicated between the user and the member data center providing the resource-k while the resource-k is being provided.

15. A non-transitory computer program product for use in a control server of a network configured to identify a set of candidate data center clusters for satisfying a service request from a user, the computer program product configured to perform a method for grouping data centers in a cloud network by comprising computer executable instructions stored in logical hardware, on non-transitory memory or a combination thereof, such that when a processor associated with the control server executes said computer executable instructions it causes the control server to perform the following:
  receive a cloud computing service request from a user;
  identify a plurality of resources for satisfying the cloud computing service request;
  identify clusters of data centers that are collectively capable of satisfying the cloud computing service request, thereby obtaining a plurality of candidate data center clusters, each of which is capable of satisfying the cloud computing service request, wherein each data center cluster includes two or more data centers configured to perform processing tasks that are interconnected via wide area network (WAN) interfaces extending between edge routers of the two or more data centers;
  compute a plurality of network communication costs each of which corresponding to a different one of the plurality of candidate data center clusters, wherein each network communication cost includes data center to data center (DC-to-DC) cost components associated with communicating information over the WAN interfaces that interconnect the two or more data centers of the corresponding data center cluster, wherein the instructions to compute the plurality of network communications costs include instructions to compute a DC-to-DC cost component for each of the network communication costs according to the formula:

$$\text{Cost}_{DC-to-DC} = \sum_{i=1, j=i+1}^{m-1} C^{r^i r^j} * V^{r^i r^j},$$

where m is equal to a number of resources in the plurality of resources, $C^{r^i r^j}$ is a cost for transporting a unit of data between a first member data center providing a first instant resource (resource-i) and a second member data center providing a second instant resource (resource-j), and $V^{r^i r^j}$ is a volume of data that must be communicated between the first member data center providing the resource-i and the second member data center providing the resource-j when providing one or both of the resource-i and the resource-j; and
  select one of the plurality of candidate data center clusters that has the lowest network communication cost, wherein the selected candidate data center cluster is used to satisfy the cloud computing service request.

16. The non-transitory computer program product of claim 15, wherein the instructions to compute the plurality of network communications costs include instructions to:
  compute a data center to user (DC-to-user cost) component for each of the network communication costs according to the formula:

$$\text{Cost}_{DC-to-User} = \sum_{k=1}^{m} C^k * V^k,$$

where m is equal to a number of resources in the plurality of resources, $C^k$ is a cost for transporting a unit of data between the user and a member data center providing an instant resource (resource-k), and $V^k$ is a volume of data that must be communicated between the user and the member data center providing the resource-k while the resource-k is being provided.

* * * * *